No. 12,627. REISSUED APR. 2, 1907.

H. B. STILZ.

YIELDABLE GEAR.

APPLICATION FILED SEPT. 18, 1906.

Witnesses

Emma L. Fleming

E. G. Stilz

Inventor

Harry B. Stilz

THE NORRIS PETERS CO., WASHINGTON, D. C.

UNITED STATES PATENT OFFICE.

HARRY B. STILZ, OF PHILADELPHIA, PENNSYLVANIA.

YIELDABLE GEAR.

No. 12,627. Specification of Reissued Letters Patent. Reissued April 2, 1907.

Original No. 807,692, dated December 19, 1905. Application for reissue filed September 18, 1906. Serial No. 335,160.

*To all whom it may concern:*

Be it known that I, HARRY B. STILZ, a citizen of the United States, residing at Philadelphia, in the county of Philadelphia and State of Pennsylvania, have invented a new and useful Yieldable Gear, of which the following is a specification.

My invention relates to improvements in yieldable gears used in transmitting power through shafting in which the speed of one shaft may be varied without interfering with the operation of the other shaft; and the objects of my improvement are, first, to provide an arrangement in which a large torque can be obtained between the frictional surfaces with a comparatively small friction-producing force; second, to bring the frictional surfaces into action in such a way that no longitudinal thrust is necessary to maintain the friction-producing force, and, third, to combine the various parts, so as to make the arrangement compact and simple. I attain these objects by the mechanism illustrated in the accompanying drawings, in which—

Figure 1:
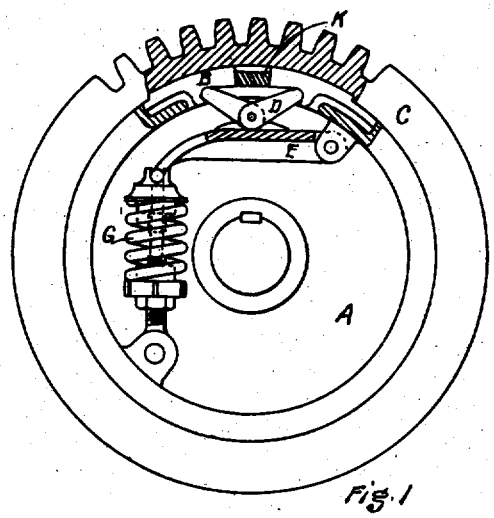
Figure 2:
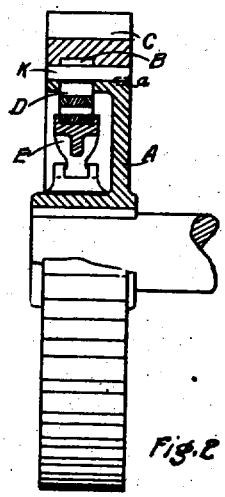
Figure 3:
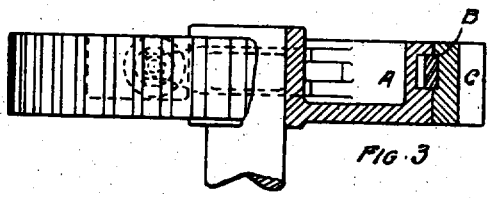
Figure 4A:
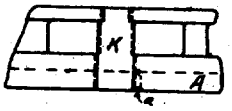
Figure 5:
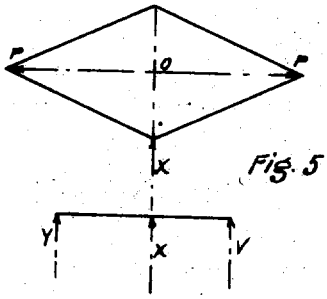
Figure 4:
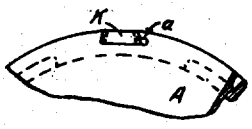

Figure 1 is an elevation and part section of the gear and mechanism assembled on a plane at right angles to the shaft. Fig. 2 is a half-section of the gear on a plane through the axis, cutting the key between the ends of the band. Fig. 3 is a half-section at right angles to Fig. 2. Fig. 4 is an elevation of a small part of the wheel A. Fig. 4[a] is a plan view of Fig. 4, and Fig. 5 is a diagrammatic view of the resolution of forces.

The wheel A is provided with a slot around its periphery of size sufficient to permit the friction-band B to be placed therein and contracted into a circumference not greater than the greatest circumference of the wheel, so that the gear C can be slipped over the band to its position on the wheel. The band is then expanded into the corresponding slot provided on the inner circumference of the gear, and the key *k*, positioned between the ends of the band, is inserted into a keyway so tapered as to prevent its slipping out radially and fastened longitudinally by the screw *a*. The band B is provided with shoulders near its ends, on which the thrust from the toggle-joint D is taken. The lever E, pivoted at one end and connected at the other to a mechanism which brings into action the pressure from the spring G, is slotted in the vicinity of its middle to hold the toggle-joint in position.

The principle on which the gear operates depends on the formula $$\frac{P_1}{P_2}=10^{0.00758fa}$$

where $P_1$ is the pressure on the thrust end of the band and $P_2$ the pressure on the slack end. $f$ is the coefficient of friction between the frictional surfaces, and $a$ the angle in degrees through which this friction acts. $P_1-P_2$ will be the pressure exerted by the band on the key *k*, which when multiplied by the outside radius of the friction-band will give the torque at which the gear will yield. With the gear turning in either direction the resolved pressure from the spring will be such as is required by the slack end of the band only, the key *k* taking all the thrust due to the turning moment on the gear.

In Fig. 5 let Y be the line of action of the force from the spring on the end of the lever, V the line of force on the other end of the lever, this being supported by the pivot, and X the line of force on the toggle. Assuming a force of two hundred pounds being exerted by the spring at Y, then since the length of the power-arm of the lever shown is to the length of its weight-arm as thirteen is to six we have the force acting on the toggle in line with X equal to $$200\times\frac{13}{6}=433.3$$

pounds. The lines PX in the diagram being drawn parallel to the lines of force in the arms of the toggle represent the amount and direction of the forces therein. Then twice the line OX will represent the force from the lever. Each force PX has a component tangential to the band represented by OP, which components represent the forces tending to separate the ends of the band. The force acting in line with OP will therefore be to the force received from the lever as OP is to twice OX, and with the toggle in the position shown this force is equal to $$\frac{111}{100}\times 433.3=481$$

pounds. Assuming a coefficient of 0.2 and considering $\alpha = 345$ degrees, we have $$\frac{P_1}{P_2} = 10^{.00758 \times .2 \times 345} = 10^{.523} = 3.335.$$

Then $$P_1 = 481 \times 3.335 = 1,604$$

and $$P_1 - P_2 = 1,604 - 481 = 1,123$$

pounds, which force would be exerted on key *k* when the gear yields, provided only tangential forces were received from the mechanism. With the mechanism shown radial forces are in action. These modify the pressure on the key *k* by additions which need not, however, be considered in practice, being comparatively small in their effect.

What I claim as my invention, and desire to secure by Letters Patent, is—

1. The combination with a shaft, a wheel secured to the shaft, a gear mounted upon and rotatable relative to the wheel, said wheel and gear having annular slots, of a split band fitted in the slot around the circumference of the wheel expansible into the slot in the body of the gear, a connection between said band and said wheel, and a mechanism by which the band is actuated against the gear.

2. A yieldable gear comprising a central member, a gear member surrounding said central member, a yieldable band arranged between said members, a stop on one of said members for holding said band against movement circumferentially of said member, and means mounted wholly on said latter member for permanently forcing said band radially against the other member.

3. A yieldable gear comprising a wheel member, a gear member concentric therewith, a yieldable band arranged between said members, a stop on one of said members against which one end of said band bears, and means mounted wholly on said latter member for permanently forcing said band radially into frictional engagement with the other member.

4. A yieldable gear comprising a wheel member, a gear member surrounding said wheel member, a yieldable band arranged between said members and concentrically with respect thereto, a stop on the wheel member against which one end of the band bears, and means mounted wholly on the wheel member and acting on the opposite end of said band for permanently forcing it radially against the interior of the gear member.

5. A yieldable gear comprising a central member, a gear member surrounding said member central, a split band arranged between said members, a connection between said band and said central member, and means mounted wholly on said central member for permanently forcing said band against the interior of said gear member.

6. A yieldable gear comprising a body member, a gear member concentric with and supported by said body member, a split band carried by said body member and arranged concentric with and between said members, and a spring mounted on said body member for permanently holding said band in frictional engagement with the interior of the said gear member.

7. A yieldable gear comprising a wheel member, a gear member surrounding said wheel member, a yieldable band arranged between said members and concentrically with respect thereto, a stop on the wheel member against which one end of the band bears, and a spring device mounted on said wheel member and coöperating with the band to force the end thereof against said stop and expand the band into frictional engagement with the gear member.

8. A yieldable gear comprising a wheel member, a gear member coaxial therewith, a yieldable band located between said members, a stop on said wheel member for holding said band against movement circumferentially thereof, and a spring device mounted on said wheel member and coöperating with the band to force the ends thereof apart and press the band radially into frictional engagement with the gear member.

9. The combination of a shaft, a wheel secured to the shaft, a gear concentric with and rotatable relative to the shaft and having a friction-surface, a yieldable band loosely fitted around the circumference of the wheel, a stop on the wheel in a position to take the thrust of the band, and means mounted upon the wheel independently of the shaft for acting upon the slack end of the band to hold it permanently in engagement with said friction-surface.

10. The combination of a shaft, a wheel member secured to said shaft, a gear member coaxial with the wheel members, a yieldable band located between said members, a stop on said wheel member for holding said band against movement circumferentially thereof, and means mounted on said wheel member independently of the shaft for operating permanently on the ends of the band to force the band radially into frictional engagement with the gear member.

HARRY B. STILZ.

Witnesses:
C. Ridgway Briggs,
E. G. Stilz.